2,861,059

HYDROLYSIS OF ACRYLONITRILE-CONTAINING POLYMERS

David T. Mowry, Kirkwood, Mo., and Eugene L. Ringwald, Decatur, Ala., assignors to Monsanto Chemical Company, St. Louis, Mo., a corporation of Delaware No Drawing. Application November 23, 1953
Serial No. 393,930

8 Claims. (Cl. 260—85.5)

This invention relates to a new method of preparing water-soluble polymers of acrylic acid. More specifically, the invention relates to a hydrolysis procedure for converting polymers of acrylonitrile to water-soluble polymeric derivatives.

Water-soluble polymers of acrylic acid are well known compositions having wide uses as stabilizers for colloids and other emulsions, as sizing agents for paper and textile products, and in recent years as agents for conditioning agricultural soil through the stabilization of soil aggregates. The products of the prior art have been prepared by a direct polymerization of acrylic acid and by the hydrolysis of acrylonitrile polymers. If the polymers prepared by either of these methods exist in water solutions it is difficult and costly to reduce them to the solid state, which form is essential for many uses. Water solutions of the hydrolyzed polyacrylonitrile are very viscous solutions and at concentrations of as low as 2 to 10% polymer, they have high viscosities and impracticably low heat transfer coefficients. Furthermore, the hydrolysis procedures, where such dilute reaction mixtures are involved, necessarily require extremely large reactor capacity and specialized reactor design for the preparation of small amounts of the solid product.

One purpose of this invention is to provide a novel hydrolysis procedure whereby the formation of viscous dilute aqueous solutions of polymers is avoided. A further purpose of the invention is to provide an industrially practicable method of converting acrylonitrile polymers into dry water-soluble polymers. A still further purpose of the invention is to hydrolyze polymeric acrylonitrile or polymers of high acrylonitrile content into polyacrylic acid derivatives in the presence of a minimum quantity of water.

In accordance with this invention it has been found that if the hydrolysis is conducted in the presence of a minimum quantity of water so that there is ample water for the hydrolysis reaction but insufficient to produce a solution, the polymer can be made entirely in the solid state and readily separated from the reaction medium by a filtration procedure. Thereafter the minor proportions of water which may be adsorbed in the product can be removed readily by conventional drying procedures. Since the hydrolysis reaction is exothermic, it is necessary to make the reaction medium sufficiently fluid so as to provide an industrially feasible heat transfer coefficient between the solid phase and reactant and the walls of the reaction vessel. This is done by introducing into the reaction mixture a water-miscible organic liquid in sufficient quantity to maintain the polymer particles as a thin slurry.

Suitable water-miscible organic liquids are the alkyl alcohols such as methyl alcohol, ethyl alcohol, isopropanol, n-propyl alcohol and the more water-soluble butyl alcohols; the ether alcohols, such as methoxy ethyl alcohol, ethoxy ethyl alcohol, butoxyethoxy ethyl alcohol and other oxa-alkyl alcohols having one or more methylene groups substituted by ether oxygen atoms, the water-soluble polyethers for example the diethyl ether of diethylene glycol and the other water-soluble aliphatic oxa-hydrocarbons having a substantial number of methylene groups replaced by ether oxygen atoms, the water-soluble ketones, such as acetone, and other water-miscible organic liquids. The organic liquid provides merely a mechanical action and therefore is not a critical part of the reaction as far as its chemical properties are concerned. Any organic liquid which is water-soluble and which obviously will not react with the other reagents present will provide a satisfactory medium for conducting this novel reaction.

Of the above water miscible organic liquids the alcohols having the following structure are preferred:

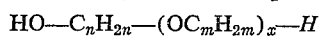

$$HO-C_nH_{2n}-(OC_mH_{2m})_x-H$$

wherein $n$ is an integer from one (1) to four (4) inclusive, $m$ is an integer from one (1) to two (2) inclusive, and $x$ is an integer from zero (0) to three (3) inclusive.

The polymers which are hydrolyzable by the novel procedure are polyacrylonitrile and polymethacrylonitrile and the copolymers of either acrylonitrile or methacrylonitrile with minor proportions (less than 50 percent by weight) of other monomers copolymerizable therewith. It is generally desirable to use as comonomers compounds which are not readily hydrolyzable or otherwise reactive with reagents which may be present. For example, if substantial quantities of vinyl acetate are used as the comonomer, the vinyl acetate increments will be hydrolyzed before the acrylonitrile increments and little or no vinyl acetate will remain in the polymer after the acrylonitrile increments are converted to acrylic acid. Thus the more effective copolymers are those wherein 90 percent or more of the composition is acrylonitrile and less than 10 percent is the more reactive comonomer.

The polymers and copolymers of acrylonitrile are preferably those of substantial weight-average molecular weight for example 10,000 to 300,000. Hydrolysis as conducted by this reaction does not appear to cause an appreciable degradation of molecular weights. The explanation of this phenomena is not available but it appears to be inherent in the unusual nature of the hydrolysis reaction.

The hydrolysis reaction is conducted in the presence of from 50 to 95 percent of the water-miscible organic liquid and from 5 to 50 percent of water. The proportion of reagents used is selected so as to avoid the dissolution of any substantial part of the product, however sufficient water should be present or subsequently added to permit the complete hydrolysis of the polymer charged. Generally, the reaction mixture is such as to maintain 60 percent or more of the reaction mixture as the water-miscible organic liquid. As the hydrolysis reaction proceeds, the proportion of water will be reduced and the tendency of the polymer to absorb water will be lessened due to the competition of the water-miscible liquid for the relatively small amount of water remaining. At the outset less than the theoretical amount of water may be charged in which case additional increments of water are required during the reaction, so as to provide the necessary amount for complete hydrolysis.

The hydrolysis is conducted in the presence of an alkali metal hydroxide and the product formed is generally the polyacrylic acid salt corresponding to the alkali metal hydroxide used. Although it is generally desirable to use a stoichiometric proportion of the alkali, a substantially complete hydrolysis can sometimes be accomplished with less than the theoretical amount because some of the nitrile groups are frequently not hydrolyzable. If desirable, the reaction may be expedited by using substantially more than the stoichiometric requirements of the alkali. Thus good results can be achieved by using from 60 to 170 percent of the stoichiometric requirement, but more satisfactory practice involves the use of from 80 to 120 percent of the requirement. The optimum reaction consumes about 90 percent of the stoichiometric requirements even though a larger proportion may be charged.

The hydrolysis reaction is initiated by preparing a mixture of water with a larger volumetric proportion of the water-miscible solvent and, after heating the mixture to the reflux temperature, adding finely divided polyacrylonitrile, polymethacrylonitrile or copolymers of either or both arcylonitrile and methacrylonitrile. The polymer is added in sufficient quantity to form a fluid slurry, care being taken to avoid an excess of polymer which would restrict the fluidity of the mixture and impede the stirring operation. As the reaction proceeds, the mixture will become slightly more viscous and as long as the stirring operation is not seriously impeded no additional solvent will be required. As the hydrolysis proceeds, gaseous ammonia is evolved from the reaction mass and may be recovered, if desired, by a suitable absorption system. Generally, the reaction may require from 2 to 48 hours depending upon the proportion of reagents charged, the fluidity of the mixture, the temperature of reaction, and the particle size of the polymer charged. The temperature of the reaction may be varied from 40° C. to the reflux temperature of the reaction mixture. It is frequently desirable to operate at pressures greater than atmospheric pressure, for example up to 1,000 lbs. per sq. inch, in order to conduct the reaction at faster rates of reaction than are otherwise possible. As the hydrolysis reaction proceeds, the mixture changes from the normal white color to yellow, then to a deep red or brown color, and as the reaction approaches completion all of the color disappears and the final product is a white solid pulverulent material. Under the optimum conditions of reaction the polymer can be discharged immediately to a filter and the residual quantity of reaction fluid can be readily separated. The polymer as recovered from the filter is a dry free-flowing powder.

Further details of the invention are set forth with respect to the following specific examples.

*Example 1*

A reaction flask equipped with a mechanical stirrer, a reflux condenser and a thermometer was charged with 88 parts by weight of sodium hydroxide, 88 parts of water and 204 parts of ethanol. The reaction flask was then charged with 106 parts of polyacrylonitrile in finely divided form and heated to the reflux temperature. The polymer became dark red in color shortly after the reaction had been initiated, and then lighter in color until at the end of seven to eight hours it was a very light yellow. Throughout the reaction ammonia gas was evolved. The polymer was filtered and washed well with ethanol. After drying at 100° C. for ten hours, the product was found to have 2.86 percent nitrogen and was mainly sodium polyacrylate.

*Example 2*

The procedure of Example 1 was repeated except potassium hydroxide in place of sodium hydroxide. The product obtained was found to be principally potassium polyacrylate.

*Example 3*

The procedure of Example 1 was repeated using polyacrylonitrile of various molecular weights and using various concentrations of sodium hydroxide, different time intervals and different solvents. The following tabulation describes the various conditions of reaction and products so obtained.

| (A) Polyacrylonitrile | | (B) NaOH, parts | Mol ratio A/B | Non-solvent, parts alcohol | Time, hrs. | Percent N in product |
| --- | --- | --- | --- | --- | --- | --- |
| Parts | Mol wt. ×10⁻³ | | | | | |
| 15 | 127 | 10 | 0.9 | 325 90% ethanol | 48 | 5.3 |
| 106 | 127 | 88 | 1.1 | 273 68% ethanol | 7 | 3.1 |
| 53 | 127 | 32 | 0.8 | 133 70% ethanol | 14 | 4.6 |
| 159 | 300 | 132 | 1.1 | 430 65% ethanol | 21 | 1.5 |
| 159 | 21 | 132 | 1.1 | ...do... | 21 | 2.5 |
| 159 | 127 | 132 | 1.1 | 435 65% methanol | 21 | 4.0 |
| 159 | 127 | 132 | 1.1 | 450 70% (7-1 mixture of n-propanol and ethylene glycol) | 5 | 2.8 |

*Example 4*

The procedure of Example 1 was used to hydrolyze a copolymer of 84 percent acrylonitrile and 16 percent vinyl chloride. The reactor was charged with 250 parts of the copolymer suspended in 600 parts of 70 percent ethanol containing 184 parts of sodium hydroxide. The reaction was conducted for eight hours at reflux temperatures and 455 parts of a water-soluble polymer was obtained, which was essentially a copolymer of vinyl chloride and sodium acrylate.

*Example 5*

A copolymer of 79 percent acrylonitrile and 21 percent vinyl acetate was hydrolyzed in the manner described by Example 1. A 250 part lot of the copolymer was suspended in a solution of 174 parts of sodium hydroxide in 600 parts of 70 percent ethanol solution. After refluxing for eight hours 430 parts of a water-soluble polymer was recovered. The nitrogen content of this polymer was 2.88 percent indicating that some nitrile or amide radicals remained.

*Example 6*

Using the procedure described in Example 1, 250 parts of a copolymer of 72 percent acrylonitrile and 28 percent styrene was hydrolyzed while suspended in a solution of 125 parts of sodium hydroxide and 600 parts of 70 percent ethanol. The reaction was conducted for eight hours at the reflux temperature. The resulting polymer, which was water-soluble, contained 4.5 percent nitrogen indicating that part of the nitrile had not been hydrolyzed, or had been merely hydrated to the amide stage.

*Example 7*

A 500 ml., three-necked flask equipped with a stirrer, and thermometer and a reflux condenser was charged with 20 grams of sodium hydroxide, 23 grams of water, 67 ml. of ethyl alcohol and 33.5 grams of polymethacrylonitrile. The reaction mixture was a thin yellow slurry of polymer suspended in the aqueous alcohol mixture. As the mixture was heated to reflux temperature gradually (82° C.) a thick dark yellow slurry developed. At this time, 25 ml. of additional ethanol was added twenty minutes after the initiation of the hydrolysis. After about two and one-half hours eleven ml. of additional water was added dropwise. One-half hour later 25 ml. of additional ethanol was added to thin the slurry. The reaction mixture was cooled to room temperature four and one-half hours after the initiation of hydrolysis. The slurry was washed with alcohol and dried at 100° C. for two hours. A one percent aqueous solution of the resulting product had a Brookfield viscosity of 1.6 poises, indicating a moderately high molecular weight. The polymer was found to have excellent properties in aggregating clay soils and thereby improving the soil structure.

*Example 8*

A 500 ml. three-necked flask provided with a mechanical stirring device, thermometer well and a reflux condenser was charged with 44.5 grams of water, 116 grams of methyl alcohol and 54 grams of a finely divided copolymer of 97 percent acrylonitrile and 3 percent vinyl acetate. The flask and its contents were heated at reflux temperature for eight hours. The finely divided polymer as charged remained suspended in the reaction medium throughout the entire reaction and the flask contents were discharged into a filter and washed with methyl alcohol. The resulting product was a white pulverulent polyacrylic acid containing 4.5 percent nitrogen.

*Example 9*

The procedure of Example 8 was repeated except that isopropanol was used in place of methyl alcohol.

*Example 10*

The procedure of Example 8 was repeated except that the diethyl ether of diethylene glycol was used in place of methyl alcohol.

This application is a continuation-in-part of applications Serial Nos. 218,293 and 257,967, filed March 29, 1951, and November 23, 1951, respectively, both now abandoned.

What is claimed is:

1. The method of hydrolyzing a polymer of at least 90 percent by weight of a nitrile having a structure

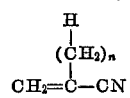

wherein $n$ is an integer from zero (0) to one (1) inclusive and up to 10 percent of another copolymerizable monomer, which comprises dispersing said polymer in pulverulent from in a mixture of 5 to 50 percent by weight of water and from 50 to 95 percent of a water-miscible inert organic liquid of the group consisting of alcohols, ethers, ether alcohols and ketones, the proportions being such that there is a fluid solid slurry of reactants in the reaction mixture at all times, heating the suspension at a temperature between 40° C. and the reflux temperature of the suspension in the added presence of an alkali metal hydroxide in the amount of at least 60 percent of the stoichiometric equivalent of the nitrile, continuing the hydrolysis until the colored product initially formed loses a substantial part of its color, and separating the resulting product by filtration.

2. The method defined by claim 1 wherein the water-miscible organic liquid is methyl alcohol.

3. The method defined by claim 1 wherein the water-miscible organic liquid is ethyl alcohol.

4. The method defined by claim 1 wherein the water-miscible organic liquid is n-propyl alcohol.

5. The method defined by claim 1 wherein the water-miscible organic liquid is isopropyl alcohol.

6. The method defined by claim 1 wherein the water-miscible organic liquid is butyl alcohol.

7. The method of hydrolyzing a polymer of at least 90 percent by weight acrylonitrile and up to 10 percent of another monomer copolymerizable with acrylonitrile, which comprises heating the said polymer with from 60 to 120 percent of the stoichiometric equivalent of an alkali metal hydroxide (based on the nitrile) while the polymer is in a pulverulent state dispersed in a liquid medium of which 5 to 50 percent by weight is water and 50 to 95 percent is an alcohol of the formula

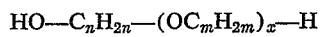

wherein $n$ is an integer from one (1) to four (4) inclusive, $m$ is an integer from one (1) to two (2) inclusive, and $x$ is an integer from zero (0) to three (3) inclusive, the proportions of said liquid medium being such as to provide at least sufficient water to effect a substantially complete hydrolysis and sufficient alcohol to retain the polymer suspension in a thin fluid state, and continuing the reaction at a temperature between 40° C. and the reflux temperature of the reaction medium until the color of the initially formed hydrolysis product is converted to a substantially color-free product, and separating the polymer by filtration.

8. The method of hydrolyzing a polymer of acrylonitrile which comprises dispersing the polymer in a liquid medium containing from 80 to 100 percent of the stoichiometric quantity (based on the acrylonitrile) of sodium hydroxide, said medium being comprised of 5 to 50 percent by weight of water and 50 to 95 percent of an alkyl alcohol having up to four (4) carbon atoms, said proportions being selected so as to provide sufficient water for substantially complete hydrolysis and sufficient alcohol to retain the hydrolyzed polymer in a fluid slurry, heating the suspension between 40° C. and the reflux temperature until the hydrolysis is substantially complete, and separating the product from the liquid medium.

References Cited in the file of this patent

UNITED STATES PATENTS

| 1,984,417 | Mark et al. | Dec. 18, 1934 |
| 2,502,715 | Germain | Apr. 4, 1950 |
| 2,566,255 | Smith et al. | Aug. 28, 1951 |